United States Patent
Williams

(10) Patent No.: US 9,051,011 B2
(45) Date of Patent: Jun. 9, 2015

(54) SPILL CONTAINMENT FLOOR WITH SEALED FLOATING FASTENERS AND STRENGTHENED SIDE RAILS FOR CONTAINER

(71) Applicant: Daniel R. Williams, Barnesville, GA (US)

(72) Inventor: Daniel R. Williams, Barnesville, GA (US)

( * ) Notice: Subject to any disclaimer, the term of this patent is extended or adjusted under 35 U.S.C. 154(b) by 0 days.

(21) Appl. No.: 13/766,641

(22) Filed: Feb. 13, 2013

(65) Prior Publication Data

US 2013/0207414 A1    Aug. 15, 2013

Related U.S. Application Data

(60) Provisional application No. 61/597,889, filed on Feb. 13, 2012.

(51) Int. Cl.
| | |
|---|---|
| *B60J 7/00* | (2006.01) |
| *B62D 25/20* | (2006.01) |
| *F16B 41/00* | (2006.01) |
| *B62D 33/077* | (2006.01) |
| *B65D 88/12* | (2006.01) |
| *B65D 90/00* | (2006.01) |
| *B65D 90/24* | (2006.01) |
| *F16B 37/04* | (2006.01) |

(52) U.S. Cl.
CPC .......... *B62D 25/2054* (2013.01); *F16B 41/002* (2013.01); *B62D 33/077* (2013.01); *B65D 88/121* (2013.01); *B65D 90/006* (2013.01); *B65D 90/24* (2013.01); *F16B 37/044* (2013.01)

(58) Field of Classification Search
USPC ............... 296/37.6; 248/678, 680; 52/698; 410/80, 81
See application file for complete search history.

(56) References Cited

U.S. PATENT DOCUMENTS

| 3,401,733 | A | * | 9/1968 | Circle ........................ 411/107 |
| 4,015,710 | A | | 4/1977 | Biggs |
| 4,884,600 | A | | 12/1989 | Wilson |
| 7,614,583 | B2 | * | 11/2009 | White ........................ 244/118.1 |
| 2003/0011207 | A1 | | 1/2003 | Campbell |

FOREIGN PATENT DOCUMENTS

| JP | 62-108285 | 7/1987 |
| JP | 2006-069632 | 3/2006 |
| WO | 2009000045 | 12/2008 |

OTHER PUBLICATIONS

International Search Report for PCT application No. PCT/US2013/025998 dated Jun. 3, 2013.
Notification Concerning Transmittal of International Preliminary Report on Patentability mailed Aug. 28, 2014, in corresponding PCT application No. PCT/US2013/025998.

* cited by examiner

*Primary Examiner* — Joseph D Pape
(74) *Attorney, Agent, or Firm* — Chicago IP Law; Steven M. Evans

(57) ABSTRACT

A mounting system for a shipping container or trailer floor having a plurality of apertures positioned to align with mounting holes of machinery having a first diameter to be mounted to the container floor, wherein the diameter of the container floor apertures are larger than the first diameter to allow a margin of error in the alignment with the machinery mounting holes. Non-circular threaded fasteners are located on the bottom surface of the container floor for receiving bolts for mounting machinery to the container floor, and a plurality of non-circular edged bases, each sized for receiving a non-circular threaded fastener such that the non-circular threaded fastener cannot rotate within non-circular edged base. The system also collects spilled machinery liquids for later removal.

20 Claims, 11 Drawing Sheets

SPILL CONTAINMENT FLOOR WITH SEALED FLOATING FASTENERS AND STRENGTHENED SIDE RAILS FOR CONTAINER

REFERENCE TO RELATED APPLICATION

This non-provisional patent application claims priority to U.S. provisional patent application entitled "Spill Containment Floor with Sealed Floating Fasteners," having application No. 61/597,889 and filed on Feb. 13, 2012, the entire contents of which are hereby incorporated by reference.

BACKGROUND OF THE INVENTION

1. Field of the Invention

The present invention relates generally to mounting arrangements for securing industrial equipment to a shipping container floor or a trailer floor, and more particularly, to an industrial equipment mounting system providing spill containment and floating fasteners. Further, the present invention relates generally to configurations for strengthening a shipping container floor or a trailer floor, and more particularly, to a stronger side rail for a shipping container or a trailer floor.

2. Description of Related Art

Mobile power generation systems capable of delivering megawatts of power are known to offer certain advantages compared to power delivered from an electrical utility power distribution grid. Mobile power generation systems can provide power as needed at times of peak demand or during brownout in a distribution grid, or during an emergency caused by a failure in the distribution grid. A mobile power generation system can be located at places distant from a distribution network where there is need for power, thus minimizing any delay or the need or expense for constructing power lines to distant or remote places.

The conventional method of transporting a mobile power station is to mount an industrial electric generator to the floor within a trailer or a stackable shipping container which is placed on a semi tractor trailer. Power generators are conventionally secured to the floor of a shipping container or semi trailer by aligning mounting holes of the generator to corresponding mounting apertures on the floor of the shipping container or semi trailer. Given the size and weight of industrial generating equipment, it can be very difficult to align mounting holes of the generating equipment with the mounting apertures in the floor. Furthermore, the mounting holes of generating equipment do not always align perfectly with the mounting apertures on the trailer floor, thus further complicating the mounting process. Additionally, the substantial weight of industrial equipment requires the floors mounting such equipment to be structurally reinforced to support such weight.

Industrial generating equipment also can have some spillage of oil, fuel, coolant, and other fluids. When these fluids escape from the generating equipment, the fluids simply spill onto the floor, creating dangerous conditions for operators and maintenance personnel.

Accordingly, there is a need for a mounting system that provides a margin of error in the alignment between the mounting holes of industrial equipment and the corresponding mounting apertures on the floors for securing the industrial equipment to the floor.

Furthermore, there exists a need for providing receptacles for spillage of fluids from industrial equipment without having to significantly modify the shipping container or semi trailer floor.

Additionally, there is a need for structurally reinforcing the floors of shipping container or trailer floors to support the subsequent weight of industrial equipment mounted to such floors.

SUMMARY OF THE INVENTION

In order to solve these deficiencies in the prior art, the present invention provides a mounting system for a shipping container or semi trailer floor or other mounting platforms having a top surface and a bottom surface. The floor includes a plurality of apertures positioned to align with mounting holes of machinery having a first diameter to be mounted to the trailer floor, wherein the diameter of the floor apertures are larger than the first diameter to allow a margin of error in the alignment with the machinery mounting holes. A mounting plate is located on the top surface of the floor and has apertures with a diameter greater than the first diameter to allow a margin of error in the alignment with the machinery mounting holes. A plurality of non-circular threaded fasteners is located on the bottom surface of the floor for receiving bolts for mounting machinery to the floor. A plurality of non-circular edged bases are each sized for receiving a non-circular threaded fastener such that the non-circular threaded fastener cannot rotate within non-circular edged base. The floor mounting system includes a threaded receptacle connected to each of the non-circular edged bases. The threaded receptacle receives a screw cap, and the screw cap is hermetically sealed to each threaded receptacle. The combination of the screw cap and threaded receptacle form a hermetically sealed chamber over each non-circular threaded fastener for receiving and containing spilled liquids.

Another embodiment of the present invention provides an improved side rail for a trailer floor having a floor with a top surface, a bottom surface, and first and second longitudinally extending edges having upward ending rims. A first C-beam extends adjacent to the first longitudinally extending edge, wherein an opening of the first C-beam faces away from the first longitudinally extending edge, and a back of the first C-beam is secured to the upward extending rim of the first longitudinally extending edge. A second C-beam extends adjacent to the second longitudinally extending edge, wherein an opening of the second C-beam faces away from the second longitudinally extending edge, and a back of the second C-beam is secured to the upward extending rim of the second longitudinally extending edge. A first corrugated rail extends longitudinally within the first C-beam, wherein peaks and valleys of the first corrugated rail connect to inner walls of the first C-beam, and a second corrugated rail extending longitudinally within the second C-beam, wherein peaks and valleys of the second corrugated rail connect to inner walls of the second C-beam.

The foregoing has outlined, rather broadly, the preferred features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiments as a basis for designing or modifying other structures for carrying out the same purposes of the present invention, and that such other structures do not depart from the spirit and scope of the invention in its broadest form.

DETAILED DESCRIPTION OF THE PREFERRED EMBODIMENT

Figure 1:
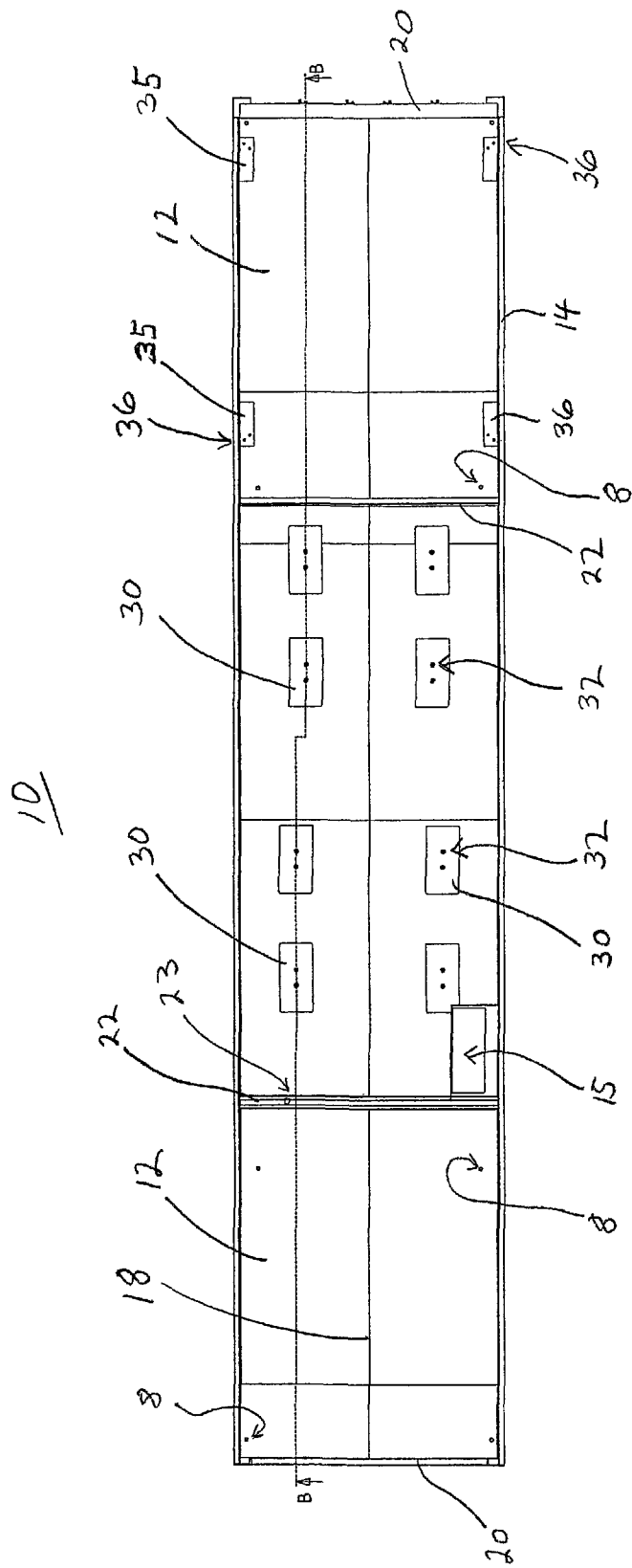
FIG. 1 is a plan view of a shipping container floor configured in accordance of the present invention.
Figure 2:
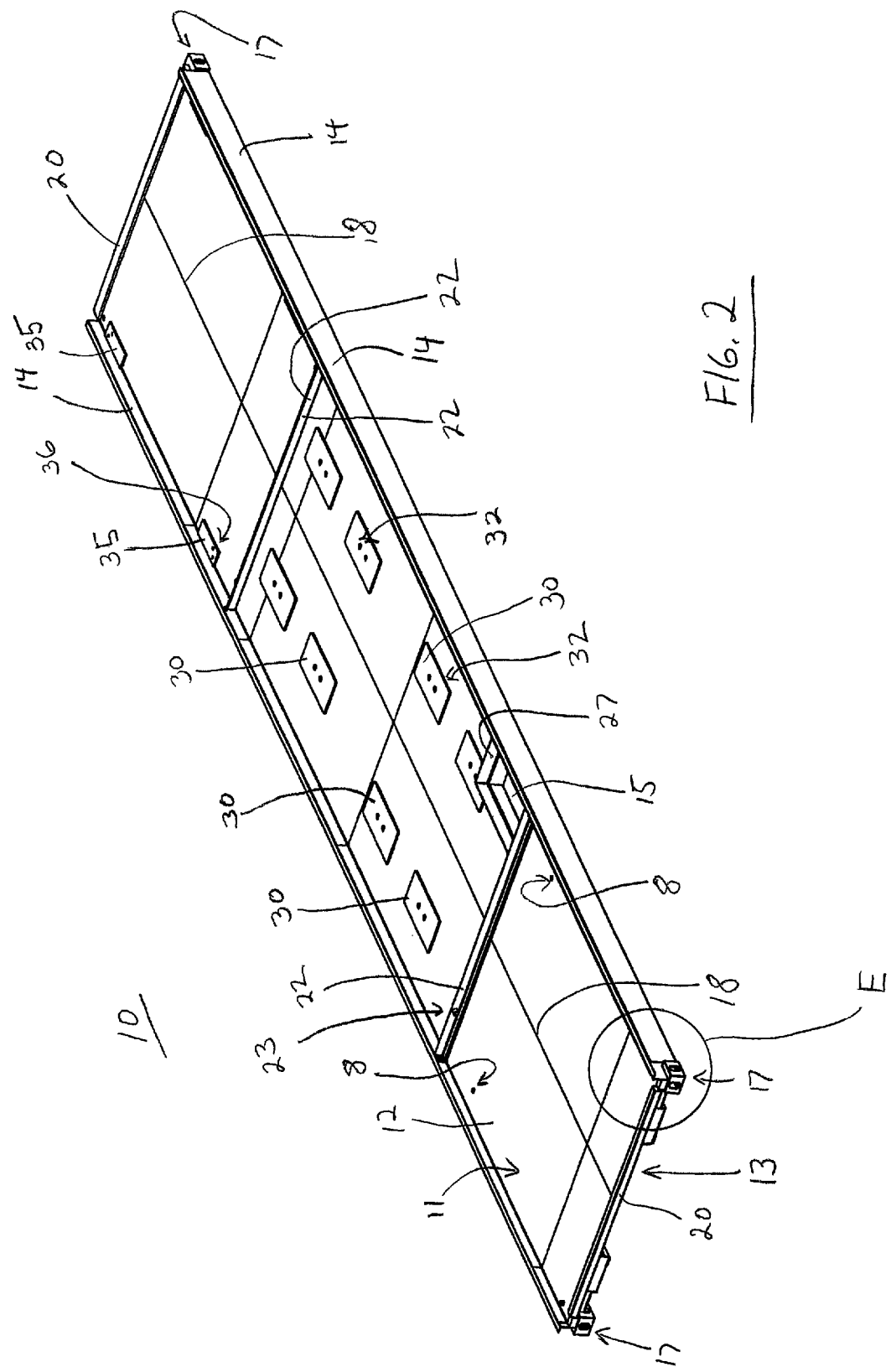
FIG. 2 is a perspective view of the shipping container floor shown in FIG. 1.

Referring now to the drawings, FIGS. 1 and 2 illustrate a floor 10 of a shipping container to be loaded onto a semi-trailer truck, semi tractor-trailer, tractor-trailer, truck and trailer, or 18-wheeler configured in accordance with the present invention. The walls and ceiling of the shipping container are not illustrated to allow the floor 10 of the shipping container to be more easily illustrated.

The floor 10 includes a base or platform 12 extending the length of the shipping container floor 10. The base 12 has a top or first surface 11 and a bottom or second surface 13. Raised edges or rims 14 extend the length of the floor 10 along the outer ends of the base 12. The base 12 is formed by welding sheets of metal plates together at joints 18. Bolted in dams 20 are located at the ends of the trailer floor 10. Bolted in dams 22 extend across the top surface 11 of the base 12 for limiting the spread of any liquid spillage on the base 12. A rectangular opening 15 provides a bottom cable access in the base 12. The bolted in dam 22 includes a coupling 23 providing drainage of water or environmentally unfriendly liquids, depending upon the location of the dam 22. Water drainage holes 8 are located in the base 12 for draining water that accumulates on the base 12 from condensation, wherein such water is not harmful to the environment. The opening 15 includes bolted in dams 27 around the periphery to prevent spillage of liquids through the opening 15. Connecting ports 17 are located on the corners of the floor 10 to enable the shipping container to be stacked and loaded.

In accordance with the present invention, mounting plates 30 are located on the base 12 of the floor 10. The mounting plates 30 include apertures 32 which are aligned with apertures 34 (FIGS. 6 and 7) in the base 12 of the floor 10. The apertures 32 and 34 both have a larger diameter than a first diameter of the mounting holes of machinery or apparatuses to be mounted to the base 12 of the floor 10. By making the diameter of the apertures 32 of the mounting plates 30 and apertures 34 of the base 12 larger than the mounting holes of the machinery to be mounted to the floor 10, a margin of error is provided in the alignment between the machinery mounting holes and the apertures 32 and 34. This margin of error functions to facilitate the mounting process of machinery to the floor 10, especially when the alignment between the machinery mounting holes and the apertures 34 in the floor 10 is not always precise.

The mounting plates 30 are preferably constructed of steel and welded to the base 12 of the floor 10. The mounting plates 30 function to provide additional strength and support for securing industrial machinery to the floor 10. Similarly, additional mounting plates 35 having apertures 36 can be located adjacent to the edges 14 for mounting additional equipment to the floor 10 at the sides of the container floor 10, such as a radiator. The edges 14 and dams 20 function to contain any spilled liquids until they can flow into the apertures 34 in the base 12 of the floor 10.

Figure 3:
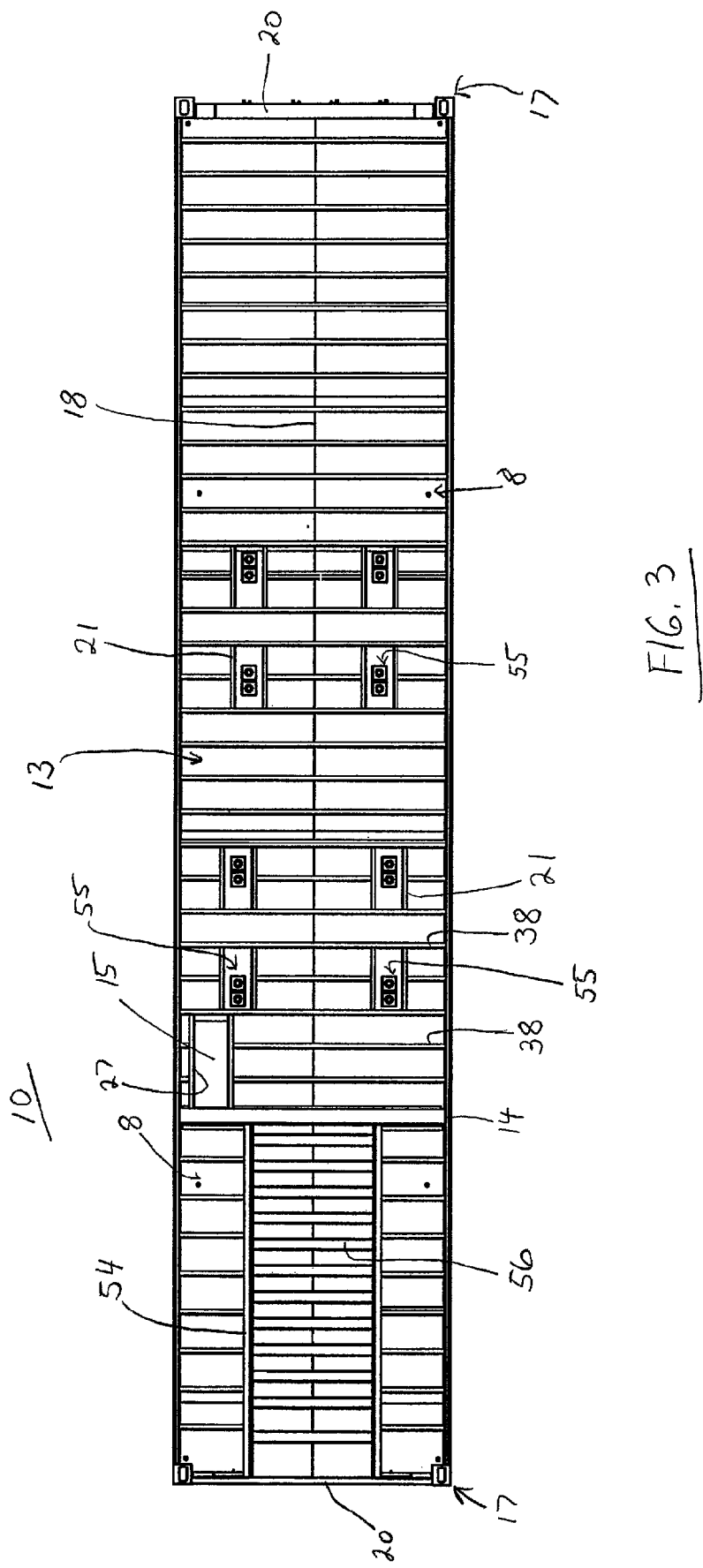
FIG. 3 is a bottom view of the shipping container shown in FIGS. 1 and 2, wherein the bottom cover is removed to show the C-brackets under the floor.

FIG. 3 is a bottom view of the floor 10 shown in FIGS. 1 and 2. Illustrated are the bottom of the floor 13, the rims 14, the bolted in dams 20, and water drainage holes 8. The bottom cable access opening 15 is shown and the joints 18. Also illustrated are horizontal C braces 38 and longitudinal C braces 21. A bottom view 55 of screw caps 48 and non-circular edged bases 44 also are shown. A gooseneck tunnel 54 is illustrated which is a receptacle for the gooseneck for the container frame or chassis. Reinforcement C-sections 56 are illustrated extending between the gooseneck tunnels 54.

Figure 4:
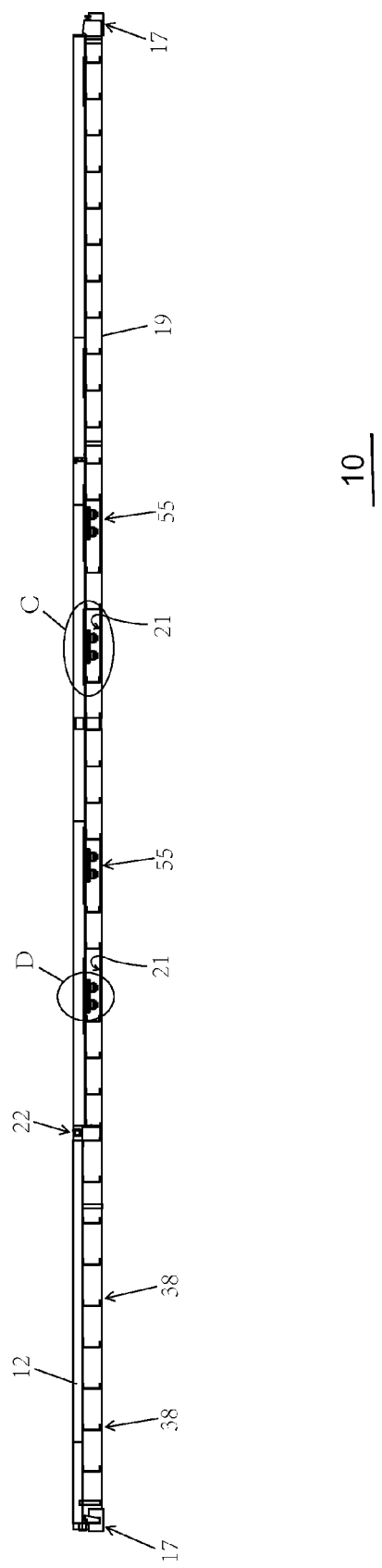
FIG. 4 is cross-sectional view of the shipping container floor shown in and taken along line B-B of FIG. 1.

FIG. 4 is a cross-sectional view of the floor 10 shown in and taken along line B-B in FIG. 1. The connecting or stacking ports 17 are illustrated. C-beams 38 are shown on under the base 12 on the bottom of the floor 10 functioning to provide additional strength and support to the floor 10. Portions C and D of the floor 10 are circled, and these circled portions are enlarged and shown in greater details in FIGS. 6 and 7, respectively. A bottom plate 19 is shown below and covering the C-beams 38 on the bottom of the floor 10.

Figure 5:
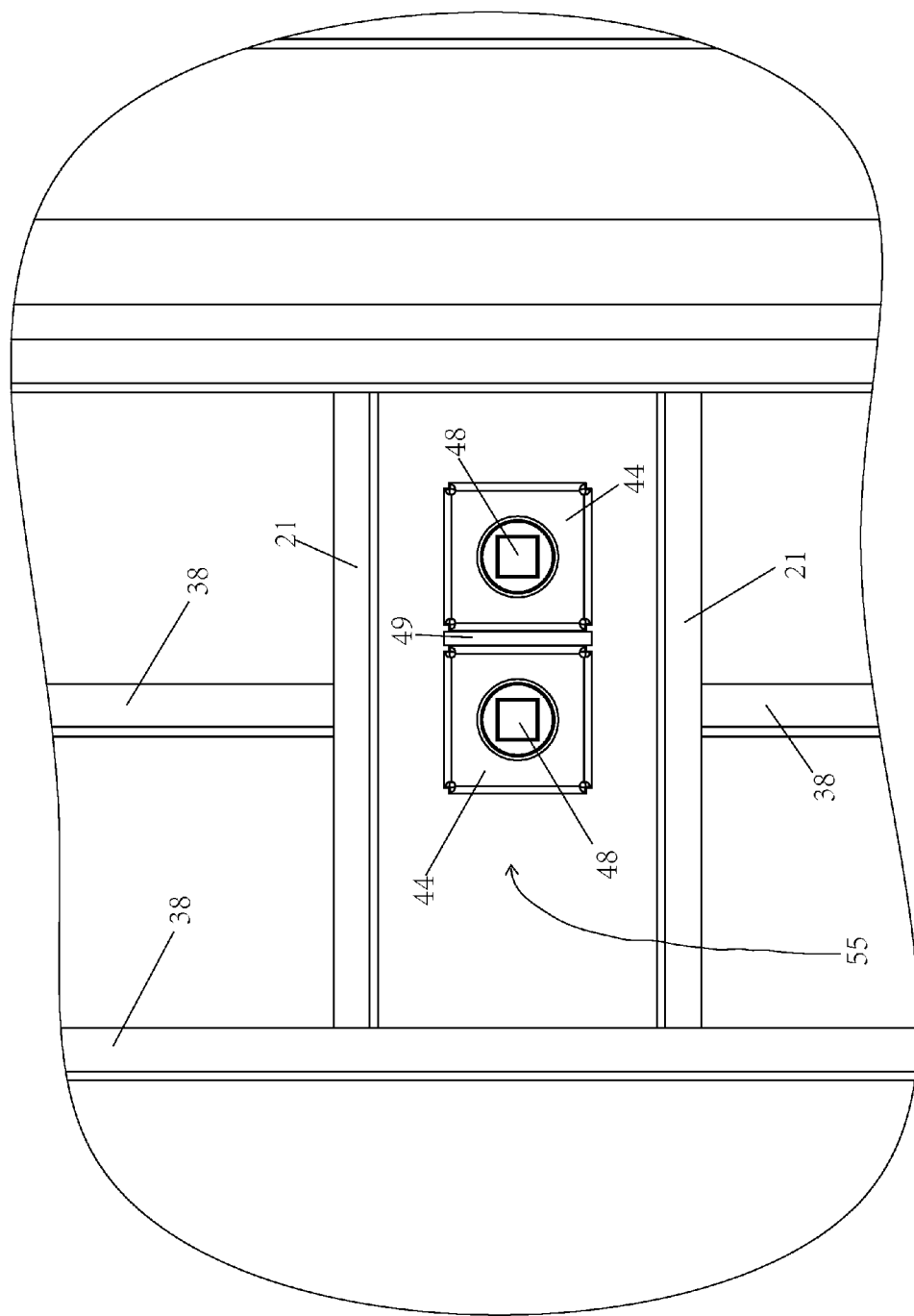
FIG. 5 is an enlarged view of screw caps and non-circular edged bases of the present invention shown in FIG. 3.

FIG. 5 is an enlarged bottom view 55 as shown in FIG. 3 of the screw caps 48 and non-circular edged bases 44 of the present invention. Also illustrated are the cross-sectional or horizontal C-beams 38 and longitudinal C-beams 21.

Figure 6:
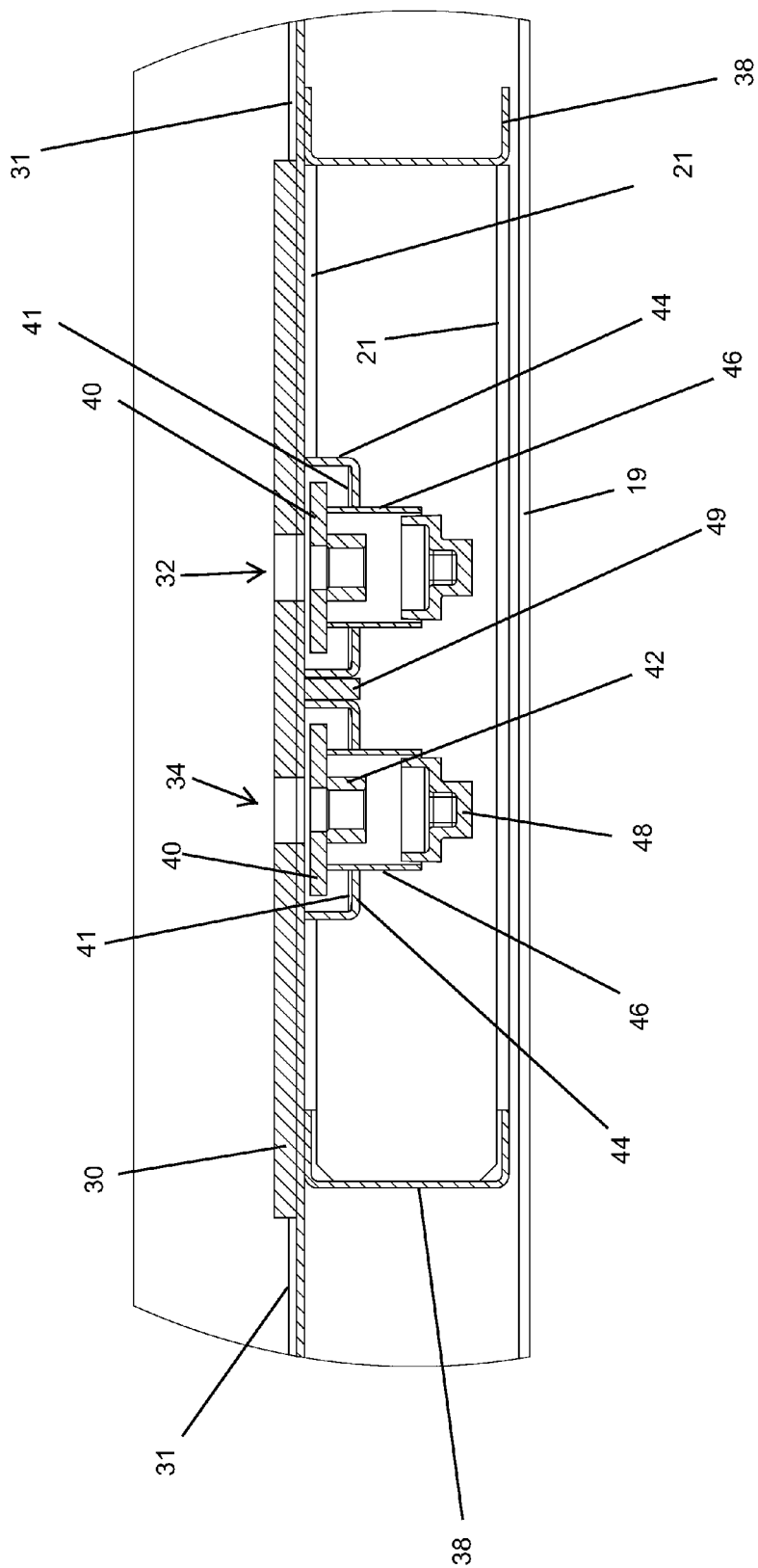
FIG. 6 is an enlarged view of a portion C of the cross-sectional view shown in FIG. 4.

FIG. 6 illustrates an enlarged view of portion C shown in FIG. 4. In accordance with a preferred embodiment of the present invention, a non-circular threaded fastener 40 is located on the bottom 13 of the base 12 for receiving a bolt for mounting machinery to the top 11 of the base 12. The non-circular threaded fastener 40 includes a threaded section 42 for receiving and securing a bolt for mounting machinery to the top of the base 12 of the floor 10. The non-circular threaded fastener 40 can be thick enough to include screw threading in its aperture wall 33 (FIG. 7), thus eliminating the need for the threaded section 42. A non-circular edged base 44 sized for receiving the non-circular threaded fastener 40 is secured to the bottom of the base 12, preferably by welding. The non-circular threaded fastener 40 and the non-circular edged base 44 are preferable constructed of steel. A spacer bar 49 is located between the non-circular edged bases 44 to provide addition support and strength to the non-circular edged bases 44. The spacer bar 49 can be a steel bar or welding material.

A threaded receptacle 46 is connected to the non-circular edged base 44, preferably by welding material 41. The threaded receptacle 46 is preferably constructed of steel. The internal walls of the threaded receptacle 46 are threaded and sized to receive a cap 48 having screw threading on its external walls. The cap 48 screws inside the threaded receptacle 46 to create a hermetically sealed chamber 47 (FIG. 7) within the threaded receptacle 48.

Accordingly, when liquids escape from machinery mounted to the base 12 of the floor 10, the liquids are retained within the floor 10 by the edges 14 and bolted in dams 20 until the escaped liquids reach the apertures 32. Upon reaching the apertures 32, the escaped liquids flow through the apertures 34 in base 12 and into the hermetically sealed chamber 47 within the threaded receptacles 46. The escaped liquids remain inside the threaded receptacles 46 until the cap 48 is unscrewed to allow the liquids to be removed from the threaded receptacle as a desired time and location.

FIG. 6 also shows an enlarged view of the C-beams 38 and a bottom plate 19 covering the C-beams 38. Also shown are the facing ends of the C-beams 21. Welding material 31 for securing the mounting plates 30 to the base 12 are illustrated in FIG. 6. Welding material 41 also is shown for securing the threaded receptacles 44 to the non-circular edges bases 46.

Figure 7:
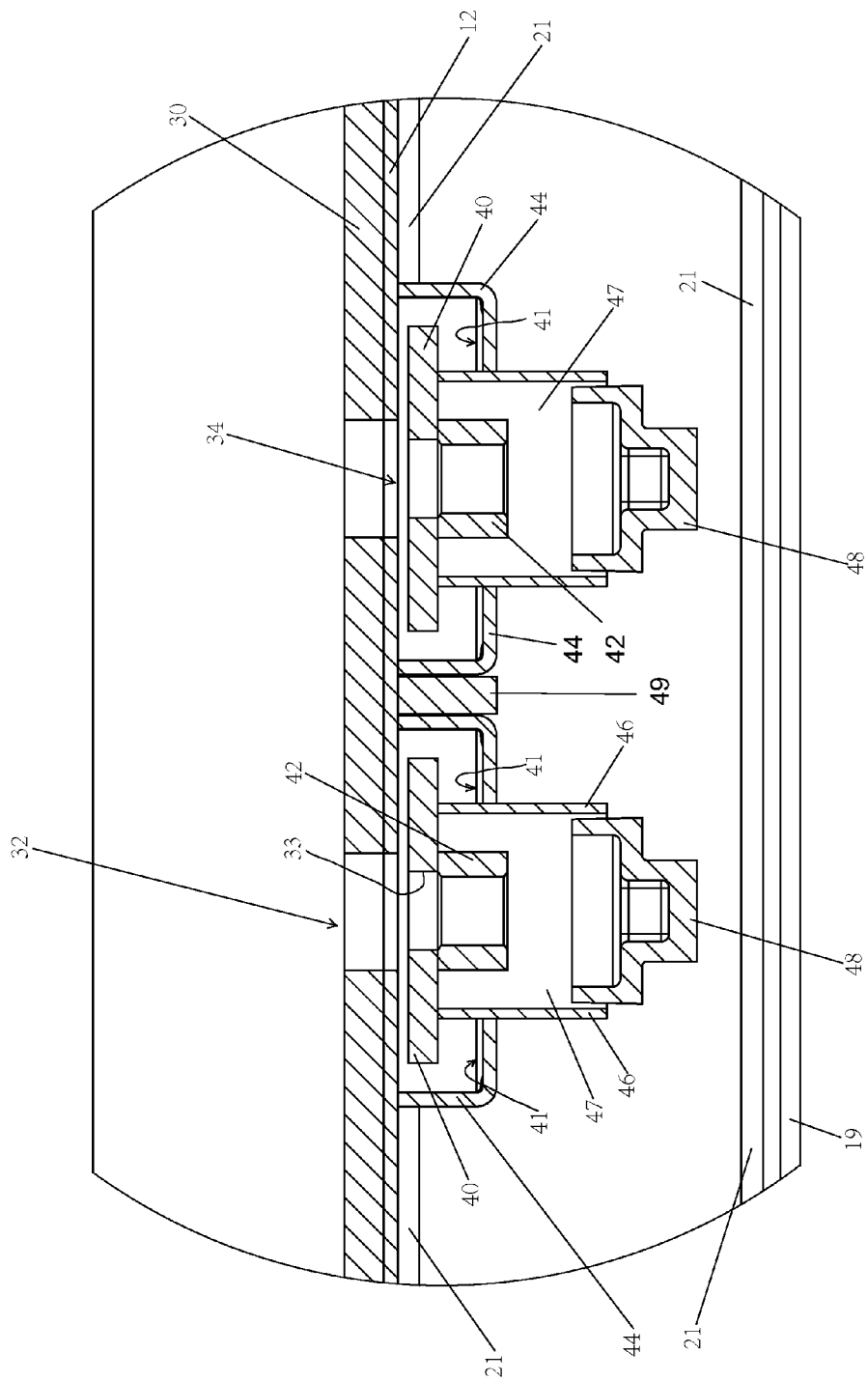
FIG. 7 is an enlarged view of a portion D of the cross-sectional view shown in FIG. 4.

FIG. 7 illustrates an enlarged view of portion D shown in FIG. 4. Similar to FIG. 6, the mounting plate 30 is illustrated on the base 12. Apertures 32 of the mounting plate 30 are shown roughly aligned with apertures 34 of the base 12. Non-circular edged bases 44 are shown attached to the bottom of the base 12. A spacer bar 49 is shown attached between the non-circular edged bases 44 for added support.

Non-circular threaded fasteners 40 are shown on the bottom 13 of the base 12 for receiving a mounting bolt through the apertures 32 and 34. The non-circular threaded fasteners 44 include threaded sections 42 for receiving and securing a mounting bolt. Threaded receptacles 46 are connected to the internally threaded receptacles 46, and caps 48 are screwed into the threaded receptacles 46 to create a hermetically sealed chamber 47 within the threaded receptacles 46 for receiving and containing spilled fluids from the mounted machinery.

Figure 8:
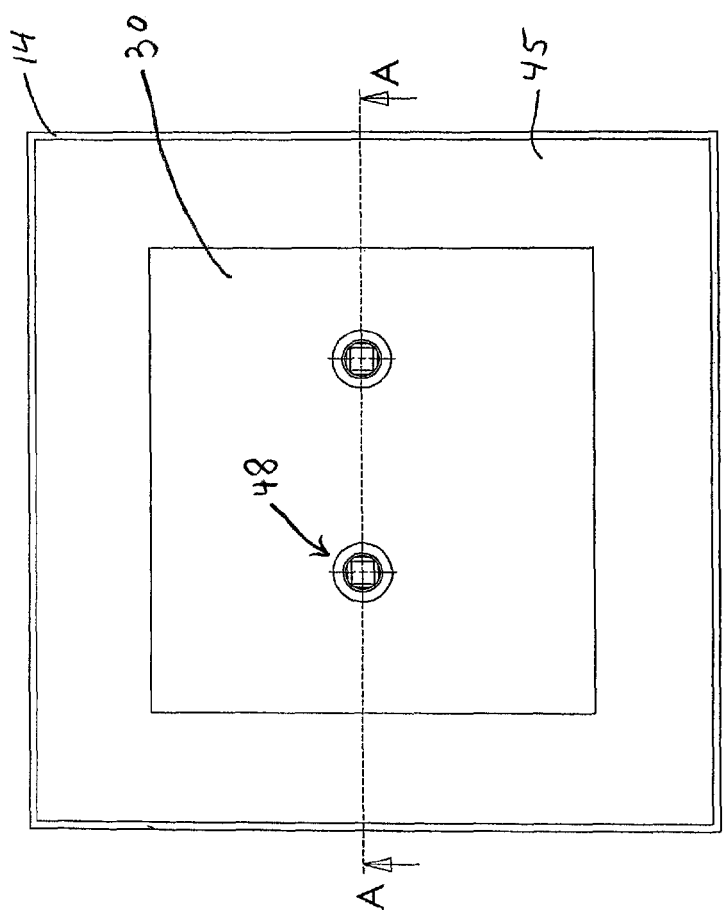
FIG. 8 is a top view a containment pan as an example of a mounting platform configured in accordance with the present invention.

FIG. 8 illustrates a top view of a containment pan 45 to provide an exemplary representation of the floor 12 of a shipping container, trailer, or other type of mounting platform configured in accordance with the present invention. Similar to a floor of a shipping container or a semi tractor trailer constructed in accordance with the present invention, the containment pan 45 having a floor 12 includes a mounting plate 30 on the top surface and raised edges or rims 14 on the periphery of the containment pan 45 for containing escaped liquids. The top of caps 48, which are screwed into threaded receptacles 46, also are illustrated in FIG. 8.

Figure 9:
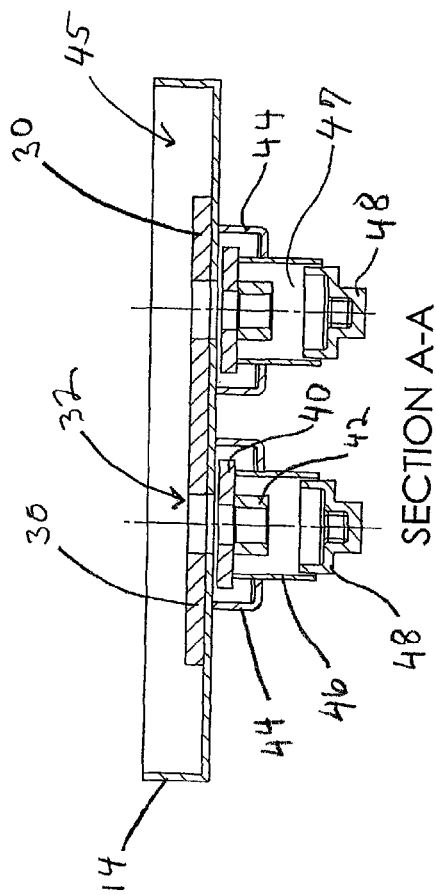
FIG. 9 is a cross-sectional view of the containment pan shown in and taken along line A-A of FIG. 8.

FIG. 9 is a cross-sectional view of the containment pan 45 shown in and taken along line A-A of FIG. 8. The raised edges 14 of the containment pan 45 are clearly shown, along with the mounting plate 30 located on the top of the containment pan 45. Similar to FIGS. 6 and 7, illustrated are the mounting plate 30 having apertures 32, non-circular threaded fasteners 40 having a threaded section 42 for receiving and securing a mounting bolt, threaded receptacle 46, and a threaded cap 48 screwed inside the threaded receptacle 46 to create a hermetically sealed chamber 47 for receiving and containing liquids escaping from machinery mounted to the mounting plate 30.

Figure 10:
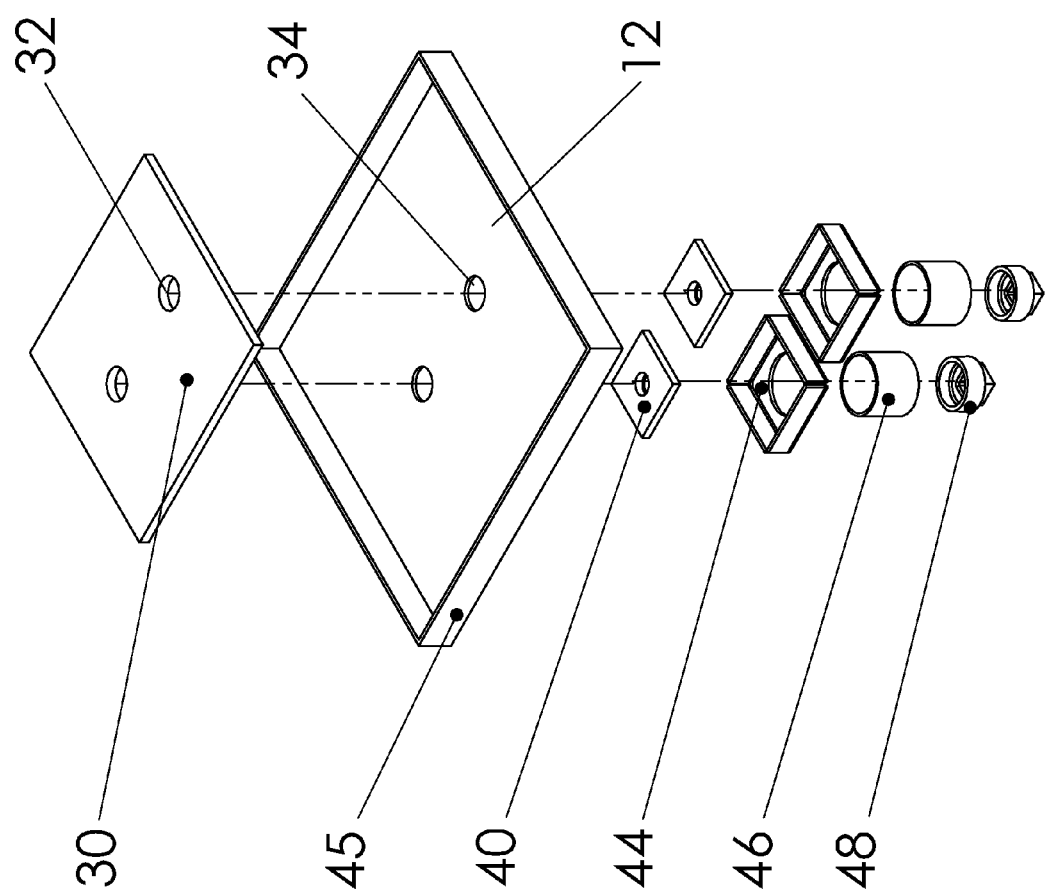
FIG. 10 is an exploded view of the containment pan shown in FIGS. 8 and 9.

FIG. 10 is an exploded view of the containment pan 45 shown FIGS. 8 and 9. FIG. 10 provides a clearer view of the components shown in FIGS. 8 and 9 constructed in accordance with a preferred embodiment of the present invention. FIG. 10 is intended to highlight the "floating" function of the non-circular threaded fasteners 40 of the present invention. By designing the apertures 32 and 34 to have a larger diameter than the first diameter of the mounting holes of machinery to be secured to the floor or base 12 of the containment pan 45, or a floor or platform in actual use, a margin of error is created so that the mounting holes of machinery to be secured do not have to line up exactly with the apertures 32 and 34 of the present invention which are designed to receive the mounting bolts for securing the machinery. The non-circular edged bases 44 allow the non-circular threaded fasteners 40 a margin or freedom, jiggle, or "float" during the mounting process, thus providing an allowable error margin in the alignment of the apertures 32 and 34 with the mounting holes of machinery, thus reducing mounting time and costs.

Additionally, due to the non-circular configuration of the non-circular threaded fasteners 40 and the non-circular edged bases 44, the non-circular threaded fasteners 40 are prevented from rotating while mounting bolts are screwed into the non-circular threaded fasteners 40 to secure machinery to the mounting plates 30. In accordance with the present invention, the non-circular threaded fasteners 40 and the non-circular edged bases 44 can be various non-circular configurations, as long as the configuration prevents the non-circular threaded fastener 40 from being able to rotate within the non-circular edges base 44.

In accordance with the present invention, the non-circular faster 40 can be serviced or replaced from the base 12 by removing the mounting plate 30, and cutting an access hole greater in diameter or width than the non-circular threaded fastener 40, but smaller in diameter than the non-circular edged base 44. This would enable the non-circular threaded fastener 40 to be replaced or serviced, because after the mounting plate 30 is welded back onto the floor 12, the non-circular threaded fastener 40 would engage the mounting plate 30, instead of the floor 12, but the invention would still function properly. In fact, a further embodiment of the invention configures the aperture 34 as originally being larger in width than the non-circular threaded fastener 40 (instead of aperture 34 being smaller in width than the non-circular threaded fastener 40, as illustrated in FIG. 10). In such a further embodiment, the non-circular fastener 40 would engage the mounting plate 30 instead of the floor 12, as illustrated in FIG. 10.

Figure 11:
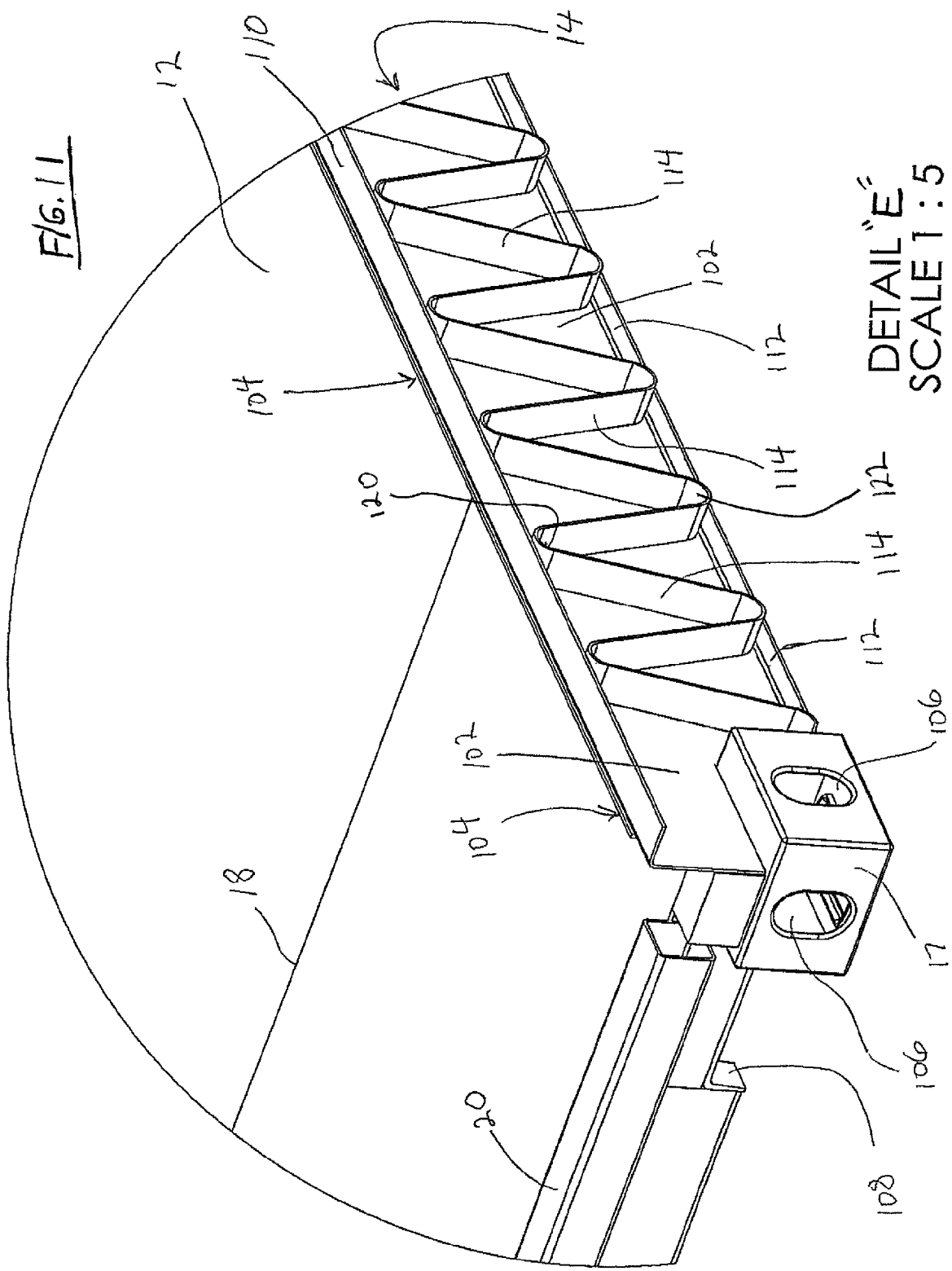
FIG. 11 is an enlarged view of portion E shown in FIG. 2.

FIG. 11 is an enlarged view of portion E shown in FIG. 2 including an improved side rail 14 configured in accordance with the present invention. FIG. 11 shows the connecting block 17 having apertures 106 for receiving hooks to lift and lower the shipping containing and floor 10 onto semi tractor trailers and train rail cars. Also illustrated is the base 12 having connecting joints 18. The raised rim 104 on the edge of the base 12 is shown adjacent to the side rail 14. A C-bracket 108 is shown extending longitudinally under the base 12. Finally, a C-bracket 110 is shown as part of the side rail 14 and extending longitudinally and connected to the raised rim 104 of the base 12.

In accordance with the present invention, an improved side rail 14 is provided by connecting a back of a C-bracket 102 to the raised rim 104 of the base 12 which extends longitudinally along the floor 10. A sine wave or corrugated side rail 114 is located within the C-bracket 102 having hills 120 and valleys 122 that connect to an upper panel 110 and lower panel 112, respectively, of the C-bracket 102.

The opening of the C-bracket 102 preferably faces outward. The back of the C-bracket 102 preferably is welded to the raised rim 104. The hills 120 of the rail 114 are preferably welded to the upper panel 110. The valleys 122 of the rail 114 are preferably welded to the lower panel 112.

The C-bracket 102, including the upper panel 110 and lower panel 112, are preferably formed out of a unitary component, such as steel. The rail 114 is preferably formed out of steel. The corrugated side rail 114 preferably has a ribbon configuration, but also can have a circular, rectangular, or other type of cross-sectional configuration. While the illustrated embodiment utilizes a C-bracket containing a corrugated side rail 114, the corrugated side rail 114 could be contained within a bracket having a different configuration from a C-bracket, such as a circular tube, rectangular bracket, I-beam, triangular, polygon, or other cross-sectional configuration. Preferably, the corrugated side rail 114 would be covered by another C-bracket facing inward and weld to or around the C-bracket 102 to provide additional strength.

Figure 12:
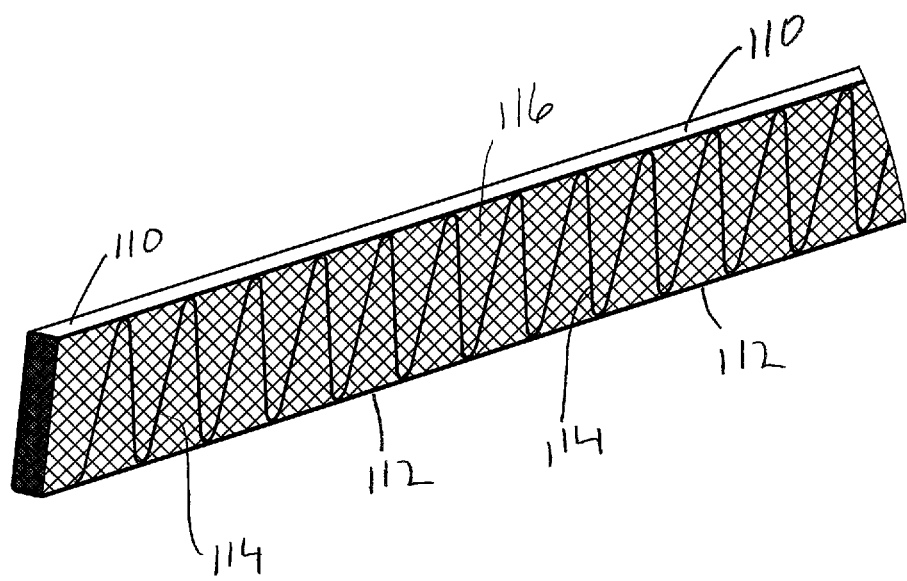
FIG. 12 is an enlarged view of the side railing configured in accordance with an additional embodiment of the present invention.

FIG. 12 is a perspective view of the corrugated side rail 114 configured in accordance with a further embodiment of the present invention. Included between the lower panel 112 and the upper panel 110, and between the corrugated side rails 114, is a sound attenuation material 116. The sound attenuation material 116 can include, but is not limited to, such materials as single foam, two-part foam, mineral wood, or a composite material. Any sound reducing material may be used as sound attenuation material 116. The sound attenuation material functions to reduce or eliminate a rattle or a loose metal noise caused by movement of the corrugated side rail within the C-bracket 102.

While specific embodiments have been shown and described to point out fundamental and novel features of the invention as applied to the preferred embodiments, it will be understood that various omissions and substitutions and changes of the form and details of the apparatus illustrated and in the operation may be done by those skilled in the art, without departing from the spirit of the invention.

The invention claimed is:

1. A floor mounting system, comprising:
a floor having a top surface and a bottom surface, the floor including a plurality of apertures positioned to align with mounting holes of machinery having a first diameter to be mounted to the floor, wherein the diameter of the floor apertures are larger than the first diameter to allow a margin of error in alignment with mounting holes of machinery;
a mounting plate on the top surface of the floor having apertures with a diameter greater than the first diameter to allow a margin of error in alignment with mounting holes of machinery;
a non-circular threaded fastener on the bottom surface of the floor for receiving bolts for mounting machinery to the floor; and
a non-circular edged base sized for receiving the non-circular threaded fastener such that the non-circular threaded fastener cannot rotate within the non-circular edged base.

2. The floor mounting system of claim 1, further comprising:
a threaded receptacle connected to the non-circular edged base;
a threaded screw cap screwed into the threaded receptacle, and said threaded receptacle being located around an aperture in the non-circular edged base; and
wherein the combination of the bottom surface of the floor, the non-circular edged base, the threaded receptacle, and the threaded screw cap form a hermetically sealed chamber around the non-circular threaded fastener.

3. The floor mounting system of claim 1, wherein the floor is part of a mobile trailer.

4. The floor mounting system of claim 1, further comprising:
a threaded section on the non-circular threaded fastener for receiving and securing a mounting bolt, wherein the treaded section provides additional threading to the non-circular threaded fastener for receiving and securing a bolt for mounting machinery.

5. A mounting system for a platform, comprising:
a platform having a first surface and a second surface, the platform including a plurality of apertures positioned to align with mounting holes of an apparatus having a first diameter to be mounted to the platform, wherein the diameter of the platform apertures are larger than the first diameter to allow a margin of error in alignment with mounting holes of an apparatus;
a mounting plate on the first surface of the platform having apertures with a diameter greater than the first diameter to allow a margin of error in the alignment with mounting holes of an apparatus;
a non-circular threaded fastener on the second surface of the platform for receiving bolts for mounting an apparatus to the platform; and
a non-circular edged base sized for receiving the non-circular threaded fastener such that the non-circular threaded fastener cannot rotate within the non-circular edged base.

6. The mounting system for a platform as defined in claim 5, further comprising:
a threaded receptacle connected to the non-circular edged base;
a threaded screw cap screwed into the threaded receptacle, and said threaded receptacle being located around an aperture in the non-circular edged base; and
wherein the combination of the second surface of the platform, the non-circular edged base, the threaded receptacle, and the threaded screw cap form a hermetically sealed chamber around the non-circular threaded fastener.

7. The mounting system for a platform of claim 5, wherein the platform is part of a mobile trailer.

8. The mounting system for a platform of claim 5, wherein the platform is located within a mobile trailer.

9. The mounting system for a platform of claim 5, further comprising:
a threaded section on the non-circular threaded fastener for receiving and securing a mounting bolt, wherein the treaded section provides additional threading to the non-circular threaded fastener for receiving and securing a bolt for mounting machinery.

10. A mounting system, comprising:
a base having a top surface and a bottom surface, the base including an aperture for receiving a bolt to secure an apparatus to the top surface of the base;
a non-circular threaded fastener on the bottom surface of the base for receiving a bolt for securing an apparatus to the top surface of the base; and
a non-circular edged base sized for receiving the non-circular threaded fastener such that the non-circular threaded fastener cannot rotate within the non-circular edged base.

11. The mounting system of claim 10, further comprising:
a mounting plate on the top surface of the base, the mounting plate having an aperture aligned with the aperture of the base for receiving a bolt to secure an apparatus to the mounting plate on the top surface of the base.

12. The mounting system of claim 11, wherein the base and the mounting plate include a plurality of aligned apertures for receiving bolts to secure an apparatus to the mounting plate on the top surface of the base, and diameters of the plurality of aligned apertures in the base and the mounting plate are greater than diameters of mounting holes of an apparatus to be secured to the mounting plate to allow a margin of error in alignment of mounting holes of an apparatus to be secured to the mounting plate and the plurality of aligned apertures in the base and the mounting plate.

13. The mounting system of claim 10, further comprising:
a threaded receptacle connected to the non-circular edged base;
a threaded screw cap screwed into the threaded receptacle, and said threaded receptacle being located around an aperture in the non-circular edged base; and
wherein the combination of the bottom surface of the base, the non-circular edged base, the threaded receptacle, and the threaded screw cap form a hermetically sealed chamber around the non-circular threaded fastener.

14. The mounting system of claim 11, further comprising:
a threaded receptacle connected to the non-circular edged base;
a threaded screw cap screwed into the threaded receptacle, and said threaded receptacle being located around an aperture in the non-circular edged base; and
wherein the combination of the bottom surface of the base, the non-circular edged base, the threaded receptacle, and the threaded screw cap form a hermetically sealed chamber around the non-circular threaded fastener.

15. The mounting system of claim 10, wherein the base is a floor of a mobile trailer.

16. The mounting system of claim 10, wherein the base is located within a mobile trailer.

17. The mounting system of claim 10, further comprising:
raised edges on the top surface of the base surrounding the aperture in the base to contain liquids spilled from an apparatus to be secured to the top surface of the base.

18. The mounting system of claim 10, further comprising:
a threaded section on the non-circular threaded fastener for receiving and securing a mounting bolt, wherein the treaded section provides additional threading to the non-circular threaded fastener for receiving and securing a bolt for mounting machinery.

19. The mounting system of claim 10, wherein:
the base includes a second aperture for receiving a bolt to secure an apparatus to the top surface of the base;
a second non-circular threaded fastener on the bottom surface of the base below the second aperture for receiving a bolt for securing an apparatus to the top surface of the base; and
a second the non-circular edged base sized for receiving the second non-circular threaded fastener such that the second non-circular threaded fastener cannot rotate within the second non-circular edged base.

20. The mounting system of claim 19, further comprising:
a mounting plate on the top surface of the base, the mounting plate having apertures aligned with the apertures of the base for receiving bolts to secure an apparatus to the mounting plate on the top surface of the base.

* * * * *